Figure 1:
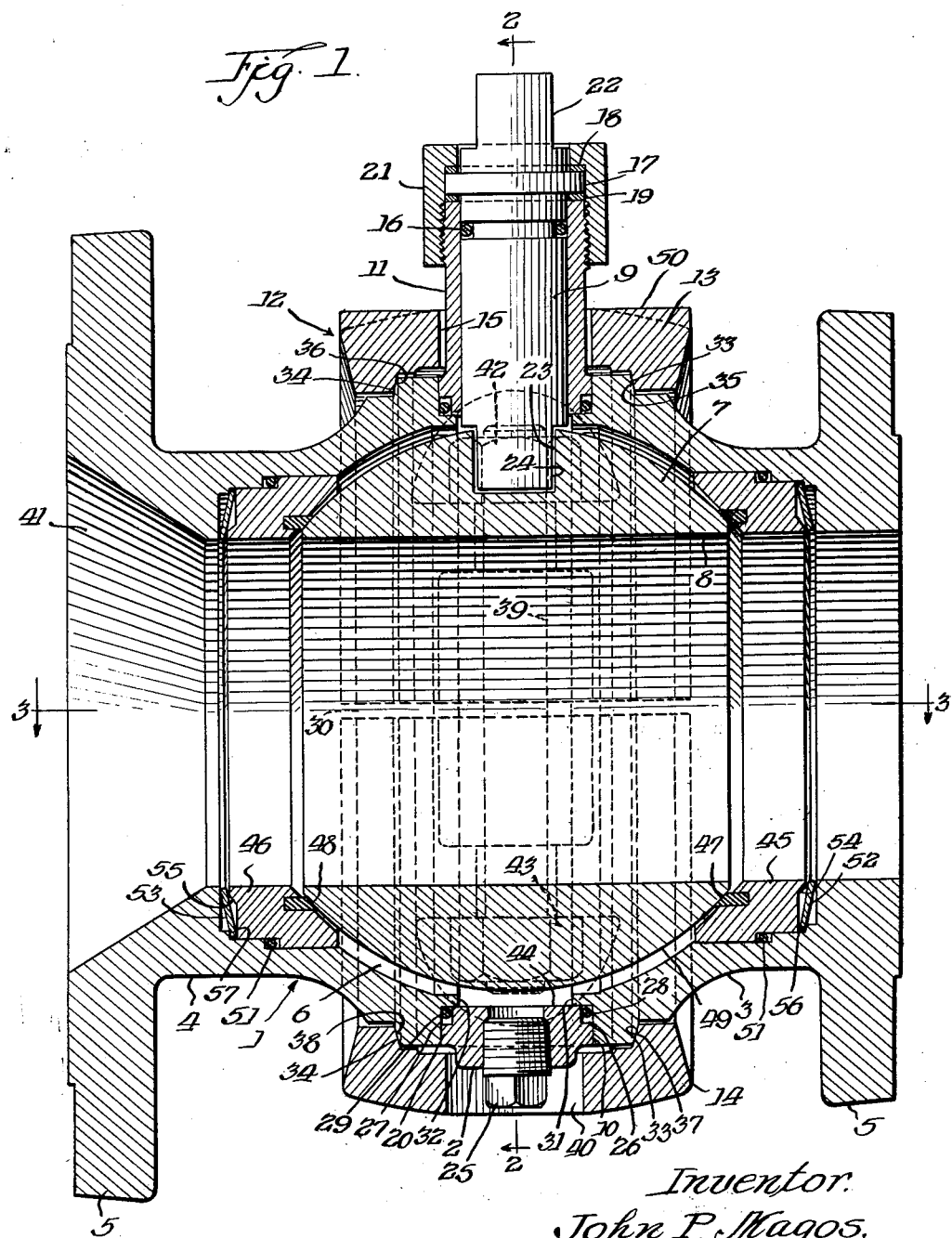

May 28, 1963

J. P. MAGOS 3,091,428

BALL VALVE WITH MULTI-PART BODY

Filed Nov. 20, 1961

3 Sheets-Sheet 1

Inventor.
John P. Magos.
By Joseph O. Lange
Atty.

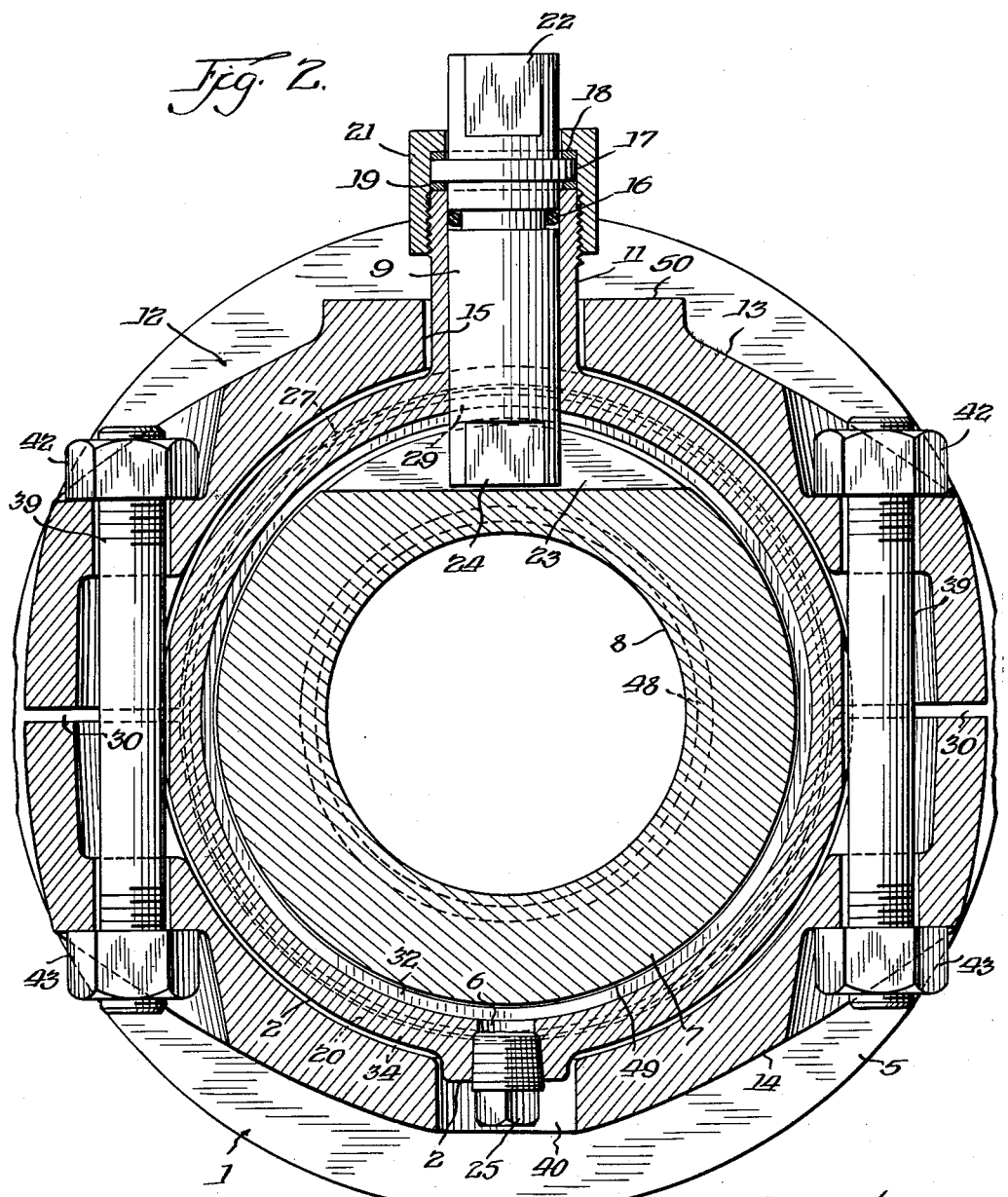

May 28, 1963 J. P. MAGOS 3,091,428
BALL VALVE WITH MULTI-PART BODY
Filed Nov. 20, 1961 3 Sheets-Sheet 3
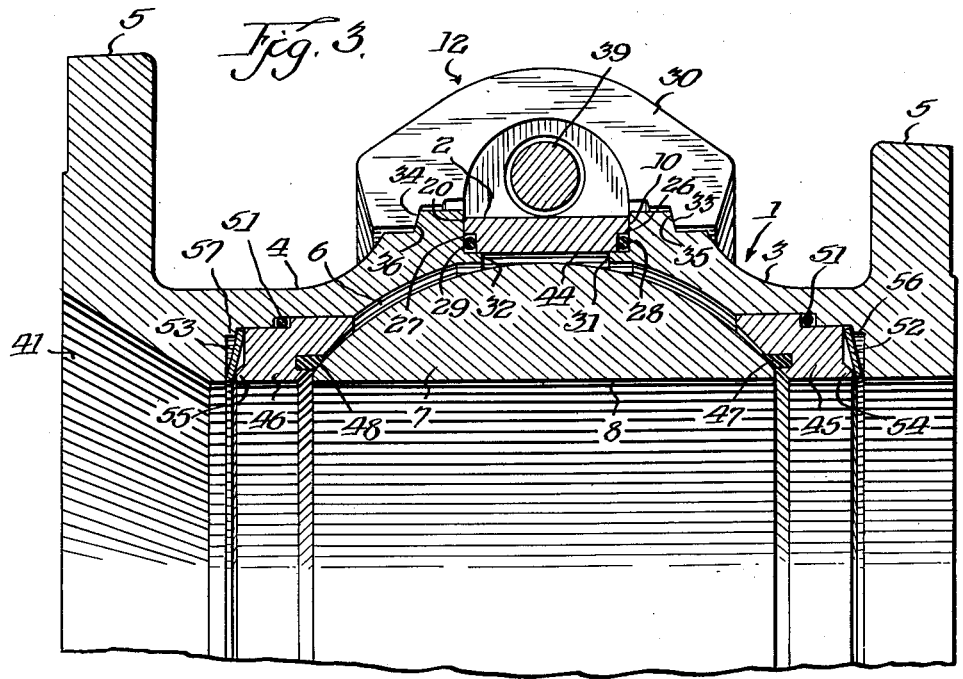
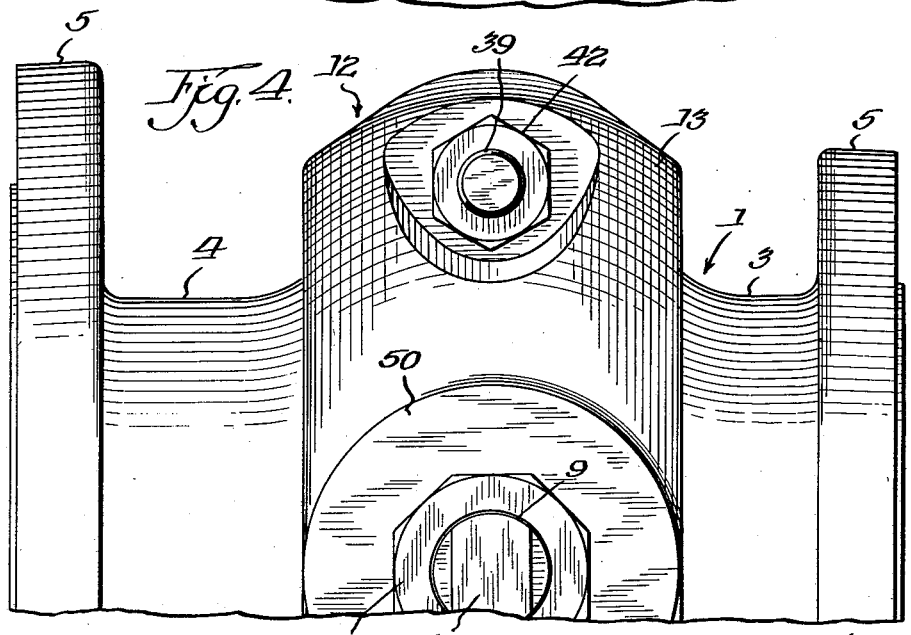
Inventor.
John P. Magos.

# United States Patent Office 3,091,428
Patented May 28, 1963

3,091,428
BALL VALVE WITH MULTI-PART BODY
John P. Magos, Wilmette, Ill., assignor to Crane Co., Chicago, Ill., a corporation of Illinois
Filed Nov. 20, 1961, Ser. No. 153,608
4 Claims. (Cl. 251—315)

This invention relates generally to a novel ball valve construction, and, more particularly, it is concerned with a multi-part body or casing therefore manufactured economically and easily assembled with a split clamp ring for effective fluid-sealing operation and replacement, repair or inspection of internal mechanism.

Heretofore in the design and manufacture of this type of valve, it will be appreciated at the outset that valve bodies or casings have been made with hemispherical port end construction with flanges and stud bolts to attach at the center section thereof. However, this has necessitated excessive weight, cumbersome handling during manufacture and frequently lacking the flexibility of design and dimensions inherent in the construction of this invention. In addition, there has been the prior objection that the opportunity to build the valve body within the shortest possible face-to-face dimensions for a compact installation has been defeated.

It is therefore one of the more important objects of this invention to provide for a valve body for a ball valve construction of body port members comprising identical end disposed cups which surround the ball closure member and cooperate compactly and effectively with a central cylindrical ring or loop section. The latter ring section preferably contains the journalling means for the valve actuating mechanism, such as the valve stem to further enhance the strength and compactness of the body construction, in addition to providing for ease of operation of the valve.

Another important object is to provide for a valve construction in which these parts which form the body of the valve are held together by means of a split or segmental clamp ring, one segment of which ring preferably has an opening through which the actuating stem portion of the central body conveniently extends.

Another important object is to provide for a ball valve body construction in which the bottom portion of the central cylindrical ring section may be provided with an opening to permit access thereto such as for a drain as required.

A further important object is to provide for a multipart valve body construction in which the split clamp ring when it is tightened during the course of assembly will force the two cup members or hemispherical port sections tightly against the central ring section of the body, and further that a fluid seal may be obtained by the use of a conveniently disposed ring gasket, O-ring, or other suitable sealing means.

A still further object is to provide for a construction of a ball valve body which provides not only for a unique method of assembly, but also for the full port area in the valve in relatively the shortest possible flange face to face dimension, while at the same time permitting of a design which can conveniently be used for reduced port area valves.

Other important objects and advantages of the construction will become more readily apparent upon proceeding with the description read in light of the accompanying drawings, in which:

FIG. 1 is a sectional assembly view of a preferred form of my invention;
FIG. 2 is a vertical sectional assembly view taken on the line 2—2 of FIG. 1;
FIG. 3 is a horizontal sectional assembly view taken on the line 3—3 of FIG. 1; and
FIG. 4 is an exterior plan partial view of the construction shown in FIG. 2.

Similar reference numerals refer to similar parts throughout the several views.

Referring now to FIG. 1, the valve body generally designated 1 consists of a central cylindrical ring section or loop member 2 and of the end disposed body port members or hemispherical cup-like members 3 and 4. Each of the latter members is provided at the outer end portions thereof with the usual end flange connections 5 for attachment to a pipe line (not shown). The latter pipe connections may of course vary depending upon the valve size and the nature of the service for which the valve is recommended.

Within the valve body chamber designated 6, a ball closure member 7 of the usual spheroidal configuration as indicated is received. It is ported as at 8 to correspond predeterminately with the inlet and outlet ports provided by the respective cups 3 and 4. The said closure member is arranged for suitable revolvability in opening or closing the valve by means of a rotatable valve stem 9 journalled within the preferably integral outwardly extending portion 11 radially arranged relative to the central cylindrical ring or loop-formed member 2. This construction is shown more clearly in the transverse sectional view provided in FIG. 2. The assembly just described consisting of the said closure member, the stem, the loop-formed member and end disposed cups is held in place by means of a clamp ring generally designated 12. The latter ring which consists of the divided upper and lower half portions or segments designated 13 and 14 respectively.

As shown more clearly in FIG. 2, at an upper portion thereof in order to allow for the projection outwardly of the loop member integral extension 11, the upper segment clamp 13 is transversely apertured as at 15. Such provision of the integral extension 11 allows for journalling the valve stem 9 therewithin, the stem member preferably being fluid sealed with the customary O-ring or packing as at 16. At its outer limit shouldered annular portion 17 thereof is provided with upper and lower thrust washers 18 and 19 enclosed by the stem retaining nut 21. At an outer end portion, the stem 9 has the projecting polygonal portion 22 for gripping and effecting the rotation of the stem 9 and in turn rotating the closure member 7 in the usual manner.

In the latter connection, outer or upper end portions of the closure member is relieved and provided with the transversely extending slot 23 within which the polygonally formed portion 24 is received in non-rotatable relation thereto. At the lower end portion of the loop-formed member 2, the drain plug 25 may be provided for such relief of the valve chamber 6 of line sedimentary deposits as may be necessary depending upon the nature of the service involved in the field. The said plug is preferably received within the opening 40 of the clamp ring segmental portion 14.

Attention is directed to the unique manner of receiving and sealing the central cylindrical ring or loop-formed member 2 which has been evolved. It will be noted that in oppositely disposed vertical planes, the annular recesses 26 and 27 have been provided in the member 2 to receive the respective O-rings 28 and 29, annular chambers thereof being formed by the cooperation of the respective relieved portions with the annular projecting portions 31 and 32 respectively defining the inner end limits of the cup-like members 3 and 4 and functioning as hereinafter described.

On outer annular portions of the said substantially hemispherical cups 3 and 4, as indicated at 33 and 34 respectively, annular outwardly inclined surfaces are provided. As shown, the latter surfaces engage similarly inclined annular surfaces 35 and 36 provided at the upper segment 13 of the clamp ring 12. Similarly, on the lower segmental clamp ring portion 14, the respective inclined annular surfaces 37 and 38 engage the surfaces 33 and 34 at the lower annular half portion of the cylindrical ring member 2.

It will now be clear that as shown in FIG. 2, the clamp ring retaining studs 39 and 41 are drawn up by means of the upper and lower nuts 42 and 43, the respective upper and lower segments or half portions of the clamp ring 12 will be drawn together and caused to contact and slide inwardly along the respective cup annular inclined surfaces 33 and 34. The respective body end portions or hemispherical cups 3 and 4 are thus caused to enter and thus be guided within the bore 44 of the central looped member 2 as shown. It will thus be apparent that the bored portion 44 upon such assembly serves as a central annular portion of the valve chamber 6 around the ported spheroidal closure member 7.

Each of the respective hemispherical cups 3 and 4 is preferably provided with axially movable seat rings 45 and 46 detailed in a separately filed patent application. The seat contacts 47 and 48 are provided for sealing cooperation with the spheroidal surface 49 of the revolvable closure member 7. The said seat rings are preferably sealed annularly with relation to the valve casing cups as at 50 and 51. In order to impart the desired force or thrust inwardly to the said seat rings 45 and 46 the tapered spring washers 52 and 53 are provided, the inner portion thereof shouldering as at 54 and 55 respectively, while on their outer portions similar annular shouldering occurs as indicated at 56 and 57. As indicated, the seat rings support the ball closure member in spaced relation to the inner periphery of the central cylindrical ring member.

It will be appreciated that in drawing up the split clamp ring 12, it will be desirable to provide that at ultimate tightness when drawing the respective members 3 and 4 together against the central looped member 2 that there shall at all times be provided a space 30 between the respective upper and lower segmental portions of the clamp ring.

In effecting the assembly of the valve, the central cylindrical ring member 2 is placed in position within the respective halves of the clamp ring, the ball closure member 7 is placed in position within the portion constituting the valve chamber 6 and fitted in place so as to bear against the respective seats. The upper portion of the clamp 12 as at 13 is then assembled by being slipped over the threads of the extension 11 and moved inwardly to bear against the annular surfaces 33 and 34. The lower segmental portion 14, seats and seat rings are positioned as indicated. The clamp ring segments are now ready for the valve assembly operation. The respective studs 39 and 41 are applied, drawing up the nuts 42 and 43 as previously stated will move the respective clamp ring segments 13 and 14 onto the inclined annular surfaces 33 and 34 whereby to pull the hemispherical cup portions 3 and 4 inwardly. Care should be taken to make certain that the respective annular lips defined at 31 and 32 enter the bore 44 of the central cylindrical ring member 2, whereby to effect said drawing together of the said cup portions to make the desired abutting annular contacts with the respective opposite surfaces 10 and 20 of the central cylindrical ring member 2.

In summary, it will be apparent that the ball valve construction of this invention lies in the center clamp design in which body port members end disposed form substantially two identical cups to surround the ball closure member and mate with a central cylindrical ring section of the body which also contains the opening for journalling the actuating stem. These three basic parts which constitute the valve body are held together by a segmental clamp ring. The latter member when tightened forces the cups snugly against the said central ring section and a fluid tight seal is obtained by an O-ring or other sealing means.

It will further be understood that the upper portion of the clamp 12 as designated by the flat surface 50 may conveniently be arranged to incorporate such supplementary features as quarter turn stops for limiting the rotation of the stem and closure member. Also, the said surface may be utilized as the means of mounting automatic operators.

From the description above given, it will also be clear that a construction has been provided, eliminating the need for employing heavy bolted sections to join the respective hemispherical cups 3 and 4 and therefore extremely large port areas within relatively reduced face to face dimensions can be conveniently and economically provided.

The form or the particular cross section of the clamping rings also may vary depending upon the form or arrangement of the looped or central cylindrical ring member and while only a single embodiment has been shown and described it will be apparent that other forms may be used falling within the spirit of the invention as defined by the appended claims.

I claim:
1. In a ball valve construction;
   (a) a multi-part body with hollow axially aligned ported cup-like members, the latter when aligned forming a valve chamber for the body;
   (b) the said cup-like members having adjoining edges including outer annular projections for effecting the joinder of said members;
   (c) a rotatable ported spheroidal closure member for the valve chamber;
   (d) a loop-formed member rigidly fixed between said cup-like members in fluid sealing abutting relation thereto;
   (e) the said loop-formed member having a substantially continuous axially aligned bore therethrough snugly engaged by said outer annular projections of said cup-like members when said joinder of the cup-like members is effected;
   (f) stem actuating means for the said closure member;
   (g) oppositely disposed axially aligned annular seats in the cup members for engagement by the said closure member in opening and closing the valve;
   (h) the said loop-formed member having an outer radially extending hollow portion for journalling said stem actuating means and inhibiting the inward movement axially of the said stem actuating means;
   (i) the said cup-like members having oppositely disposed annular portions having edges with annular outwardly inclined surfaces for effecting the attachment thereof;
   (j) and divided coupling means comprising clamp segments and retaining bolting therefor for engaging said outwardly inclined surfaces to draw the cup-like members toward each other and effect said joinder.

2. The subject matter of claim 1, one of said clamp elements being transversely apertured to loosely receive and locate said radially extending hollow portion for said stem actuating means relative to the valve central axis.

3. The subject matter of claim 2, the other of said clamp elements being transversely apertured to provide drains therefrom.

4. The subject matter of claim 1, the said radially extending hollow portion having removable shoulder means cooperating therewith to inhibit axial movement of said stem actuating means outwardly relative to the said clamp segment.

References Cited in the file of this patent

UNITED STATES PATENTS

| | | |
|---|---|---|
| 2,032,623 | Lewis | Mar. 3, 1936 |
| 2,480,529 | Waag | Aug. 30, 1949 |
| 2,685,889 | Leighton | Aug. 10, 1954 |
| 2,890,017 | Shafer | June 9, 1959 |

FOREIGN PATENTS

| | | |
|---|---|---|
| 916,720 | France | Aug. 26, 1946 |